United States Patent [19]

Taniguchi

[11] E Re. 29,899

[45] Reissued Feb. 6, 1979

[54] CHROME INSERT RING

[75] Inventor: Isao Taniguchi, Yono, Japan

[73] Assignee: Nippon Piston Ring Co., Ltd., Tokyo, Japan

[21] Appl. No.: 875,661

[22] Filed: Feb. 6, 1978

Related U.S. Patent Documents

Reissue of:

[64] Patent No.: 4,030,767
Issued: Jun. 21, 1977
Appl. No.: 710,488
Filed: Aug. 2, 1976

[30] Foreign Application Priority Data

Aug. 2, 1975 [JP] Japan ..... 50-93697

[51] Int. Cl.[2] ..... F16J 15/00; F16J 9/12

[52] U.S. Cl. ..... 277/235 R; 29/156.63

[58] Field of Search ..... 277/DIG. 6, 96 R, 96 A, 277/168–172, 223, 224, 235 A, 236, 235 R; 29/156.6, 156.61, 156.62, 156.63

[56] References Cited

U.S. PATENT DOCUMENTS

| | | | |
|---|---|---|---|
| 2,380,654 | 7/1945 | Lane et al. | 277/235 A X |
| 2,905,512 | 9/1959 | Anderson | 277/235 A |
| 3,133,341 | 5/1964 | Marien | 29/156.63 |
| 3,421,198 | 1/1969 | Prasse | 29/156.6 |
| 3,615,099 | 10/1971 | Prasse | 277/235 A |
| 3,770,286 | 11/1973 | Angilella et al. | 277/235 A |

FOREIGN PATENT DOCUMENTS

| | | | |
|---|---|---|---|
| 526707 | 9/1940 | United Kingdom | 29/156.6 |

*Primary Examiner*—Robert S. Ward, Jr.
*Attorney, Agent, or Firm*—Sughrue, Rothwell, Mion, Zinn and Macpeak

[57] ABSTRACT

A chrome insert ring including ring elements each having its outer peripheral surface formed with an annular groove. The chrome insert ring has a groove made with two symmetrical side walls having a plurality of steps inclined from the groove sides to the groove bottom.

6 Claims, 4 Drawing Figures

CHROME INSERT RING

Matter enclosed in heavy brackets [ ] appears in the original patent but forms no part of this reissue specification; matter printed in italics indicates the additions made by reissue.

BACKGROUND OF THE INVENTION

The invention relates generally to improved piston rings for use in internal combustion engines. It relates especially to a chrome insert ring for use as a pressure ring, which has annular chrome plate bands in the outer peripheral surfaces of the ring matrix.

Conventionally, various kinds of constructions in piston rings, especially pressure rings, have been proposed in recent years for adaptation to high speed and high power internal combustion engines. It is well known in the art that a chrome insert ring, which has annular hard chrome plate bands in grooves in the outer peripheral surface of the ring and a cast iron matrix exposed between the chrome plate bands, exhibits desirable performance as a pressure piston ring. In such chrome insert ring, the hard chrome plate bands serve to improve the abrasive resistance of the ring, and the exposed cast iron matrix serves to reduce the initial period for mating the ring to the engine and to compensate for the poor oil maintaining property of the chrome plate bands.

However, there have been certain disadvantages connected with the production process for conventional chrome insert rings. That is, as shown in FIG. 1, the insert ring is produced by stacking and fixing a plurality of ring elements CP1, CP2, . . . , each of which is formed with an annular groove 21 or 22 of trapezoidal cross section in the center portion of the outer peripheral surface thereof, and removing the portion of chrome not in the groove by cutting the structure along the chain line A, so as to expose the cast iron matrix between the chrome plate bands and at the top and bottom of the piston ring face.

During the plating operation, the projections at the opposite sides of the groove 21 prevent smooth plating to the groove bottom, especially to the groove corners in the vicinity of the opposite sides, so that the resulting chrome plate has its surface formed with annular recesses 4. This requires a long plating time, which is substantially three times that required for the case of a chrome plate produced with no recess all over the chrome plate surface, and has a strong influence on cost.

SUMMARY OF THE INVENTION

This invention has for its main object the elimination of the above described disadvantage found in the production of chrome insert rings and especially in the plating time, and enables the reduction of the plating time to a great extent in comparison with the prior art and the provision of a piston ring with its performance equivalent to or above the conventional piston ring.

The object is achieved by constructing a chrome or like metal insert ring having a groove in the peripheral surface thereof, characterized in that the groove has a radial cross section such that the flat bottom wall and the flat side walls extending to the surface at acute angles do not meet at groove corners but are connected by one or more additional wall surfaces extending therebetween.

DETAILED DESCRIPTION OF THE PREFERRED EMBODIMENTS

Figure 1:
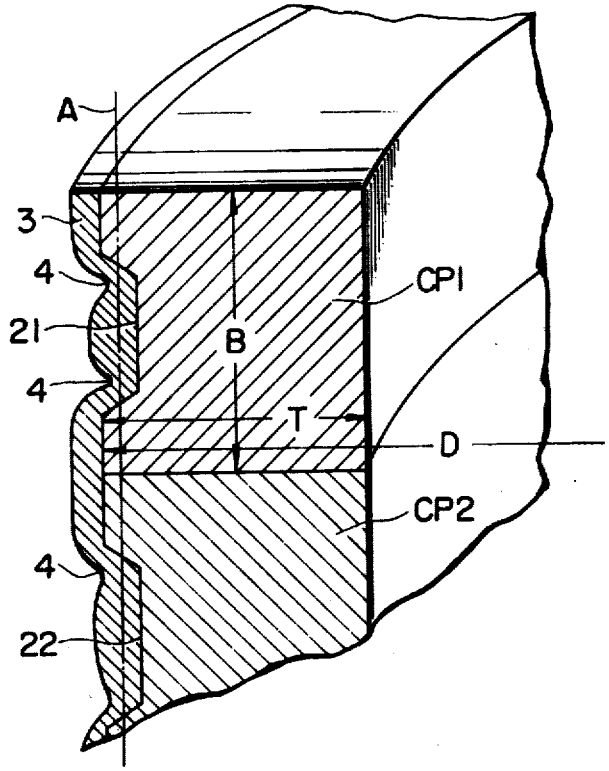
FIG. 1 is a partly perspective view of a conventional chrome insert ring during a stage of the fabrication process.
Figure 2:
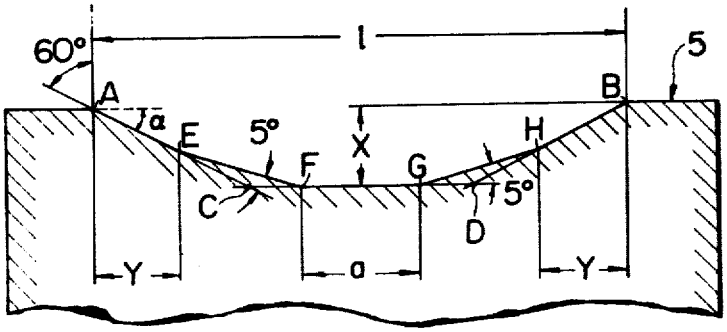
FIG. 2 is a radial sectional view of the groove portion of an insert ring illustrating one embodiment in accordance with the invention.

FIG. 2 is a sectional view showing the outer periphery of a pressure ring, in which reference numeral 5 indicates the surface for abutting against a cylinder inner surface. In the prior art chrome insert ring, the cross section of the groove is of a trapezoidal shape made up of three straight lines AC, DC, and DB as described above. According to the invention herein the groove has a cross section made up of straight lines AE, EF, FG, GH, and HB so as to eliminate the influence on plating to the opposite corners C and D of the groove bottom. That is, the groove of an insert piston ring in accordance with the present invention has an additional step or slanted surface in the vicinity of the points which would constitute groove corners in conventional shaped grooves. A groove having a cross section which meets the following conditions has proven satisfactory in experiments:

$$0 < x - y/\cot\alpha \leqq 0.05 \text{ mm, and}$$
$$[0 < l - \alpha/2 \leqq 0.57 \text{ mm, where}]$$

$$0 < \frac{l - a}{2} - y \leqq 0.57 \text{ mm;}$$

*where* x : depth of the groove;

y : distance of the first side wall projected along the piston ring surface;

l : width of the groove;

$\alpha$ : angle of first side walls with ring surface and specifically should be 5° to 50° and preferably about 30°[.];

*a : width of the flat bottom surface.*

Figure 3:
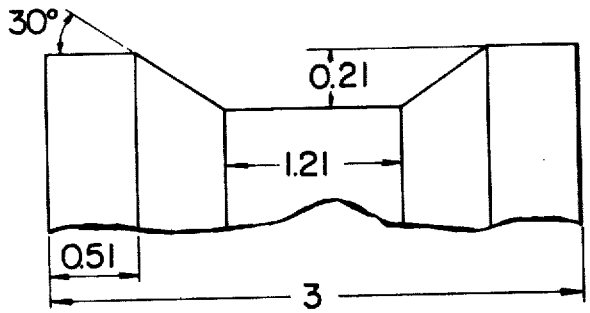
FIG. 3 is a sectional view of a conventional groove of a chrome insert ring used for a comparative test.
Figure 4:
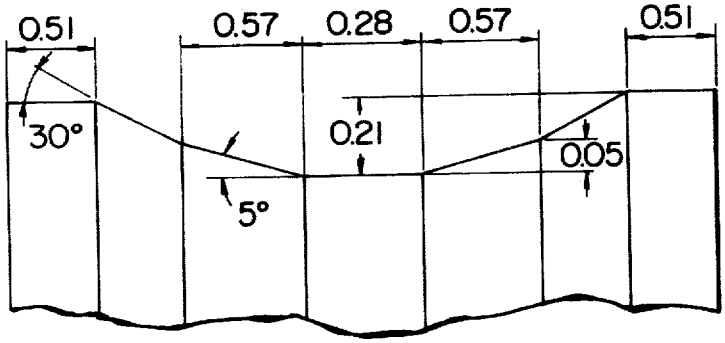
FIG. 4 is a sectional view of a groove of a chrome insert ring according to this invention which was used for a comparative test.

The surprising advantage of constructing an insert type piston ring having a groove cross section as explained above can be appreciated by noting the plating time and cost savings resulting therefrom as compared to the conventional ring. For example, for a hard chrome plated ring member having an outer diameter of 108 mm, an axial thickness of 3mm, a radial width of 4.5 mm and a groove of the mm dimensions shown in FIG. 3, the time required to form a desired hard chrome plate was 11 hours. On the other hand, when a second ring, identical in dimensions to the first ring except that it has a groove as shown in FIG. 4 (which groove meets the above conditions), is plated with chrome, the resulting plate surface had no recess and was substantially parallel to the groove bottom. Further, the time required to obtain a desired chrome plate was 8 hours. This shows that the novel construction of this invention results in a 27 percent savings of plating time and plating material.

By providing such construction to the groove, the invention can reduce the plating time to a great extent and provide a low cost chrome insert ring having a performance equivalent to or above the conventional one.

Further, a grinding operation was applied to the chrome plated surfaces of the two rings so as to expose the cast iron matrix between the chrome plate bands. For this operation, about 7 minutes was required for the ring with the conventional grooves, whereas 5 minutes was required for the ring according to the present invention. This shows the invention exhibits a distinctive effect.

While the invention has been shown and described specifically with reference to the groove construction in which two additional steps are added to the conventional trapezoid cross section in the vicinity of the opposite groove bottom corners, there is no intent to limit the spirit and scope of the invention to this construction and it will be understood that the like result can be obtained by providing further steps to the groove side wall.

What is claimed is:

1. A hard metal insert piston ring of the type having a groove in the periphery thereof, said groove being filled with said hard metal, the cross section of said groove having a flat bottom wall and two flat side walls extending angularly from the surface of said piston ring towards said flat bottom surface and towards one another, the improvement characterized by; said cross section of said groove having additional flat side walls between said first mentioned side walls and said flat bottom surface, all said walls and said bottom surface meeting at angles greater [that] *than* the angle between imaginary extensions of said first side walls and said flat bottom surface.

2. A hard metal insert piston ring as claimed in claim 1 wherein said hard metal is chrome.

3. A hard metal insert piston ring as claimed in claim 1 wherein said additional flat side walls consist of two additional flat side walls, one extending between one of said first side walls and said bottom surface, and the other extending between the other of said first side walls and said bottom surface.

4. A hard metal insert piston ring as claimed in claim 3 wherein said hard metal is chrome.

5. A hard metal insert piston ring as claimed in claim 3 wherein said cross section of said groove satisfies the conditions:

$$0 < x - y / \cot \alpha \leqq 0.05 \text{ mm, and}$$

$$[0 < l - \alpha/2 \leqq 0.57 \text{ mm, where}]$$

$$0 < \frac{l - a}{2} - y \leqq 0.57 \text{ mm;}$$

*where* x : depth of the groove;

y : distance of each of said first side walls projected onto the piston ring surface;

l : width of the groove;

α : acute angle formed by each of said first side walls and a projection of said ring surface, and being between 5° to 50°[.];

*a : width of the flat bottom surface.*

6. A hard metal insert piston ring as claimed in claim 5 wherein said hard metal is chrome.

* * * * *